US012583095B2

(12) United States Patent
West

(10) Patent No.: US 12,583,095 B2
(45) Date of Patent: Mar. 24, 2026

(54) MECHANIC'S CREEPER WITH LIGHTS

(71) Applicant: Derrek K. West, Clarksburg, WV (US)

(72) Inventor: Derrek K. West, Clarksburg, WV (US)

( * ) Notice: Subject to any disclaimer, the term of this patent is extended or adjusted under 35 U.S.C. 154(b) by 276 days.

(21) Appl. No.: 18/368,794

(22) Filed: Sep. 15, 2023

(65) Prior Publication Data

US 2025/0091195 A1 Mar. 20, 2025

(51) Int. Cl.

| | |
|---|---|
| ***B25H 5/00*** | (2006.01) |
| ***F21S 9/02*** | (2006.01) |
| ***F21V 19/02*** | (2006.01) |
| ***F21V 23/04*** | (2006.01) |
| ***F21V 33/00*** | (2006.01) |
| *F21Y 103/10* | (2016.01) |
| *F21Y 115/10* | (2016.01) |

(52) U.S. Cl.

CPC .................. *B25H 5/00* (2013.01); *F21S 9/02* (2013.01); *F21V 19/02* (2013.01); *F21V 23/0414* (2013.01); *F21V 33/0012* (2013.01); *F21Y 2103/10* (2016.08); *F21Y 2115/10* (2016.08)

(58) Field of Classification Search

CPC ..................................... B25H 5/00; F21S 9/02
USPC ........................................................ 280/32.6
See application file for complete search history.

(56) References Cited

U.S. PATENT DOCUMENTS 5,330,211 A * 7/1994 Nicholson ................ B25H 5/00 280/32.6
6,238,069 B1 5/2001 Miles
6,702,305 B2 * 3/2004 Miles ....................... B25H 5/00 280/32.6
7,032,907 B1 4/2006 Marsh
7,032,908 B2 * 4/2006 Melvin .................... B25H 5/00 280/32.6
7,712,750 B2 * 5/2010 Whiteside ................ B25H 5/00 280/32.6
2005/0051980 A1 3/2005 Melvin
2010/0123293 A1 5/2010 Benjamin
2011/0227303 A1 9/2011 Gering
2014/0027990 A1 1/2014 Triglia
2015/0084293 A1 3/2015 Huang
2017/0232608 A1 8/2017 Coutts
2017/0368677 A1 12/2017 Rotenberg et al.

(Continued)

FOREIGN PATENT DOCUMENTS

CN 108274444 A * 7/2018 ............... B25H 5/00

*Primary Examiner* — Steve Clemmons
(74) *Attorney, Agent, or Firm* — Cramer Patent & Design, PLLC.; Aaron R. Cramer

(57) ABSTRACT

A Mechanic's Creeper with Lights is a mechanic's creeper equipped with integrated task lighting powered by a rechargeable battery pack. The device is provided with multiple light emitting diode (LED) lights on either side of the headrest. The lights are low profile and do not interfere with use of the creeper. The lights, held in place via magnets, are wired together to a common switch located at the top of the creeper that is easily reached when laying on the creeper. The lights are powered by a typical removable battery pack used to power portable tools such as those from DeWalt®, Milwaukee®, or the like. Various adapters to utilize different battery systems and voltages could be provided. The battery pack is located on the underside of the device near the user's head for easy access should removal of the battery for recharging be necessary.

2 Claims, 5 Drawing Sheets

(56) References Cited

U.S. PATENT DOCUMENTS

| | | | | |
|---|---|---|---|---|
| 2023/0283091 | A1* | 9/2023 | Olsson | B25F 5/00 320/136 |
| 2024/0375265 | A1* | 11/2024 | Valencia | F21V 33/008 |
| 2025/0012412 | A1* | 1/2025 | Boucher | F21V 23/002 |

* cited by examiner

MECHANIC'S CREEPER WITH LIGHTS

RELATED APPLICATIONS

None.

FIELD OF THE INVENTION

The present invention relates generally to a mechanic's creeper and more specifically to a mechanic's creeper with enhanced features such as bright moveable LED lights, a powered upper body inclining feature, and a large variety of rechargeable battery adapters.

BACKGROUND OF THE INVENTION

Everyone who does a lot of work with their hands will relate to the fact that having the right tool for the job is absolutely essential. The appropriate tool can save time, money, produce a higher quality job, decrease damage to equipment, and provide for the greater safety of the worker. These benefits all come from the same source: increased productivity. The mechanic's creeper is an example of an instrument that is put to good use in the field of automobile repair. The mechanic's creeper enables personnel to do inspections or repairs underneath a vehicle while lying on their backs and moving over its underside. Even in working conditions that are lit throughout the day, the underside of a vehicle is often not brightly illuminated. This necessitates the user making use of some form of supplemental lighting for the task at hand, such as a flashlight.

However, attempting to hold a flashlight while working underneath a vehicle is an incredibly challenging task, particularly if one is also attempting to grasp other instruments. Even if another person is available to carry a flashlight, it is practically impossible to get the light in the appropriate position due to the restricted space under a vehicle. Accordingly, there is a need for a system by which supplementary light can be delivered under a motor vehicle while using a mechanic's creeper in a manner that addresses the concerns described above. This need has been satisfied by the creation of the mechanic's creeper with lights.

SUMMARY OF THE INVENTION

Embodiments of the present disclosure may include a creeper apparatus including a frame made of square metal tubing including a frame top. Embodiments may also include a frame bottom, and. Embodiments may also include four offset extensions each having an offset extension lower side. Embodiments may also include a 360-degree rotating caster secured upon the offset extension lower side of each four offset extensions.

Embodiments may also include a fixed seat cushion positioned on the frame top. Embodiments may also include an inclining back cushion, aligned with the fixed seat cushion, configured to allow for a flat configuration or an inclination angle from one to sixty degrees. Embodiments may also include a pair of fixed seat cushion padded side bolsters attached to a right side of the fixed seat cushion and a left side of the fixed seat cushion.

Embodiments may also include a pair of inclining back cushion padded side bolsters attached to a right side of the inclining back cushion and a left side of the inclining back cushion. Embodiments may also include a headrest secured adjacent to the inclining back cushion and between the pair of inclining back cushion padded side bolsters. Embodiments may also include a pair of light-emitting diode bar lights, each including a swivel mount.

Embodiments may also include a power source and lifting motor in electrical communication with the pair of light-emitting diode bar lights. Embodiments may also include a power switch configured to selectively actuate electrical communication between the power source and pair of light-emitting diode bar lights. In some embodiments, each swivel mount permits 180 degree clockwise or counter-clockwise rotational movement of each light-emitting diode bar lights. In some embodiments led lights may be attached to the inclining upper section on both sides of the head support In some embodiments, each swivel mount may be secured upon an opposite side of the frame top and positioned on either side of the pair of inclining back cushion padded side bolsters and headrest. In some embodiments, each light-emitting diode bar light may be configured to illuminate a selectable area about a head of a user.

In some embodiments, the power source may include a removable rechargeable battery pack in electrical communication with the pair of light-emitting diode bar lights, a powered seat back lifting mechanism, and a direct current motor. In some embodiments, the removable battery pack may be located on the underside of the frame adjacent the headrest.

In some embodiments, the removable battery pack may be compatible with battery packs from different manufacturers through the use of an adapter plate. In some embodiments, the four offset extensions permit the fixed seat cushion and the inclining back cushion to be lowered to a level at or beneath a top surface of each four offset extensions. In some embodiments, at least one offset extension of the frame may be equipped with a double-pole double-throw switch for changes in an angular displacement of the inclining back cushion.

In some embodiments, the inclining back cushion may be raised or lowered using a corkscrew-type lifting mechanism operated by the direct current motor. In some embodiments, the corkscrew-type lifting mechanism supports the upper body weight of the user.

In some embodiments, the inclining back cushion can be elevated along an inclination angle of up to sixty degrees. In some embodiments, the power switch controls the operation of the light-emitting diode bar lights. Embodiments may also include a wiring harness for electrical connections to the removable battery pack, the double-pole double-throw switch, the power switch, the direct current motor, and the light-emitting diode bar lights.

In some embodiments, the wiring harness routes within a hollow confines of the frame and the offset extensions. In some embodiments, the electrical power for the creeper may be derived solely from the removable battery pack. Embodiments may also include a battery port and an adapter plate for electrical and physical interconnection of the removable battery pack, allowing the use of different manufacturer's batteries.

Embodiments may also include the inclining back cushion which may be attached to the creeper using a pivoting hinge and a support backplate. In some embodiments, the support backplate may be driven along an extension arm travel path, corresponding to the inclination angle of the inclining back cushion. In some embodiments, the double-pole double-throw switch may be an on-off-on style switch, deactivating the direct current motor when not held in a specific position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | creeper |
| 15 | frame |
| 20 | caster |
| 25 | five-inch diameter wheel |
| 30 | fixed seat cushion |
| 35 | inclining back cushion |
| 40 | side bolster |
| 45 | headrest |
| 50 | bar lights |
| 55 | swivel mount |
| 60 | offset extension |
| 65 | removable battery pack |
| 70 | adapter plate |
| 75 | double-pole double-throw (DPDT) switch |
| 80 | power switch |
| 85 | inclination angle "a" |
| 90 | corkscrew type lifting mechanism |
| 95 | direct current motor |
| 100 | pivoting hinge |
| 105 | support backplate |
| 110 | extension arm |
| 115 | extension arm travel path "e" |
| 120 | wiring harness |
| 125 | battery port |

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
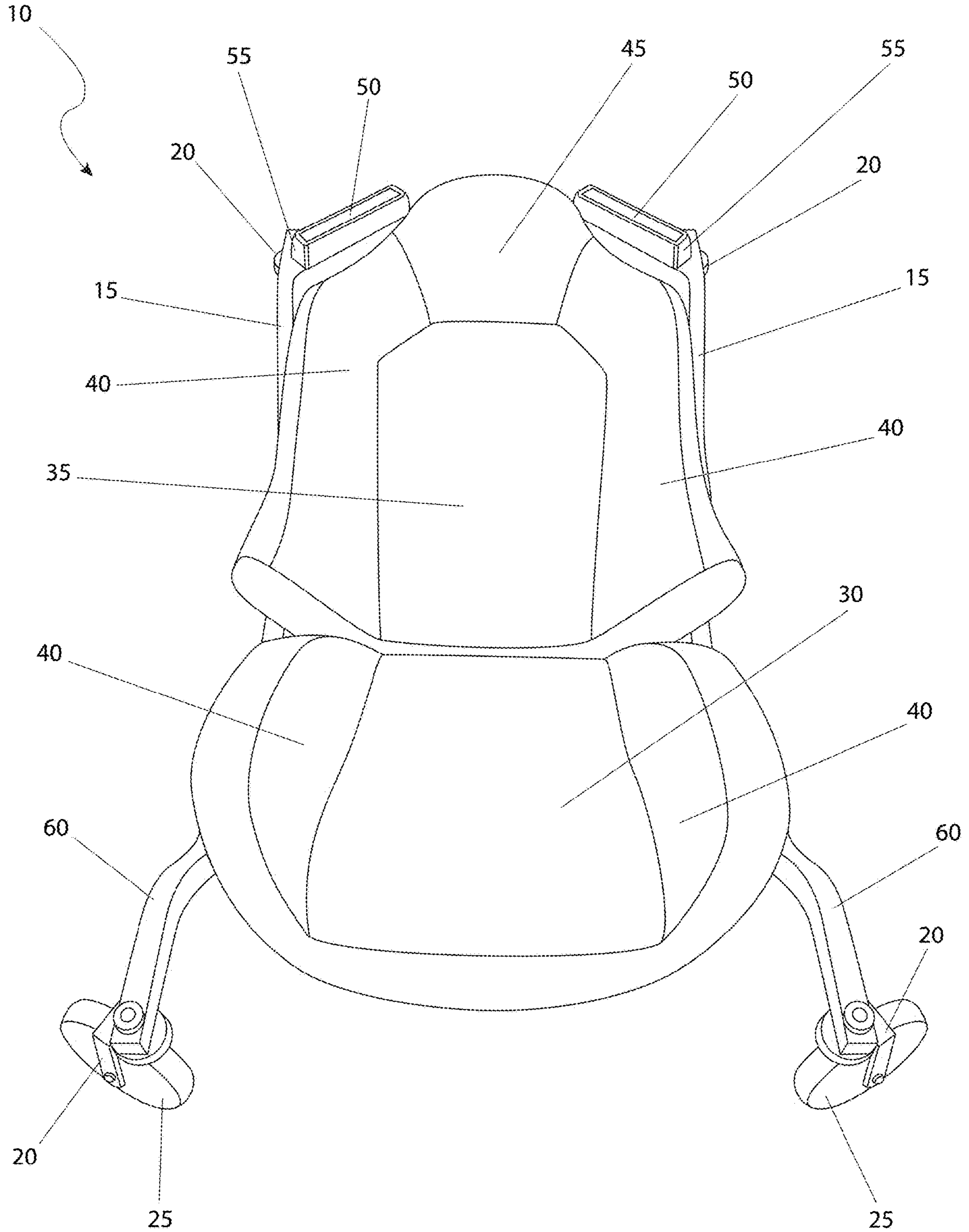
FIG. 1 is a top perspective view of a creeper 10, according to the preferred embodiment of the present invention.

Referring now to FIG. 1, a top perspective view of the creeper 10, according to the preferred embodiment of the present invention is disclosed. The creeper (herein also described as the "creeper") 10, is equipped with integrated task lighting and a powered seat back lifting mechanism that are both powered by a removable rechargeable battery pack. The creeper 10 is provided with a frame 15, envisioned to be made of square metal tubing. The frame 15 is supported by four (4) 360-degree (360°) rotating casters 20 that each utilize a five-inch diameter wheel 25. The large nature of the five-inch diameter wheel 25 allows each caster 20 to easily roll over rough grade, and/or small objects that may be found on the floor such as blots, nuts, washers, bits of wire, zip ties, or the like.

The top of the frame 15 is provided with a fixed seat cushion 30, while the top of the frame 15 is provided with an inclining back cushion 35. Both the fixed seat cushion 30 and the inclining back cushion 35 are provided with padded side bolsters 40, while the inclining back cushion 35 is provided with a headrest 45. Located immediately to either side of the headrest 45 are two (2) light-emitting diode (LED) bar lights 50, each equipped with a swivel mount 55. The swivel mount 55 allows the light-emitting diode (LED) bar lights 50 to be adjusted such that they illuminate areas above the user's head while their head is resting on the headrest 45. The adjustment feature is common swivel mount 55 capable of 180 degree clockwise or counter-clockwise rotational movement of each light-emitting diode bar lights 50.

Figure 2:
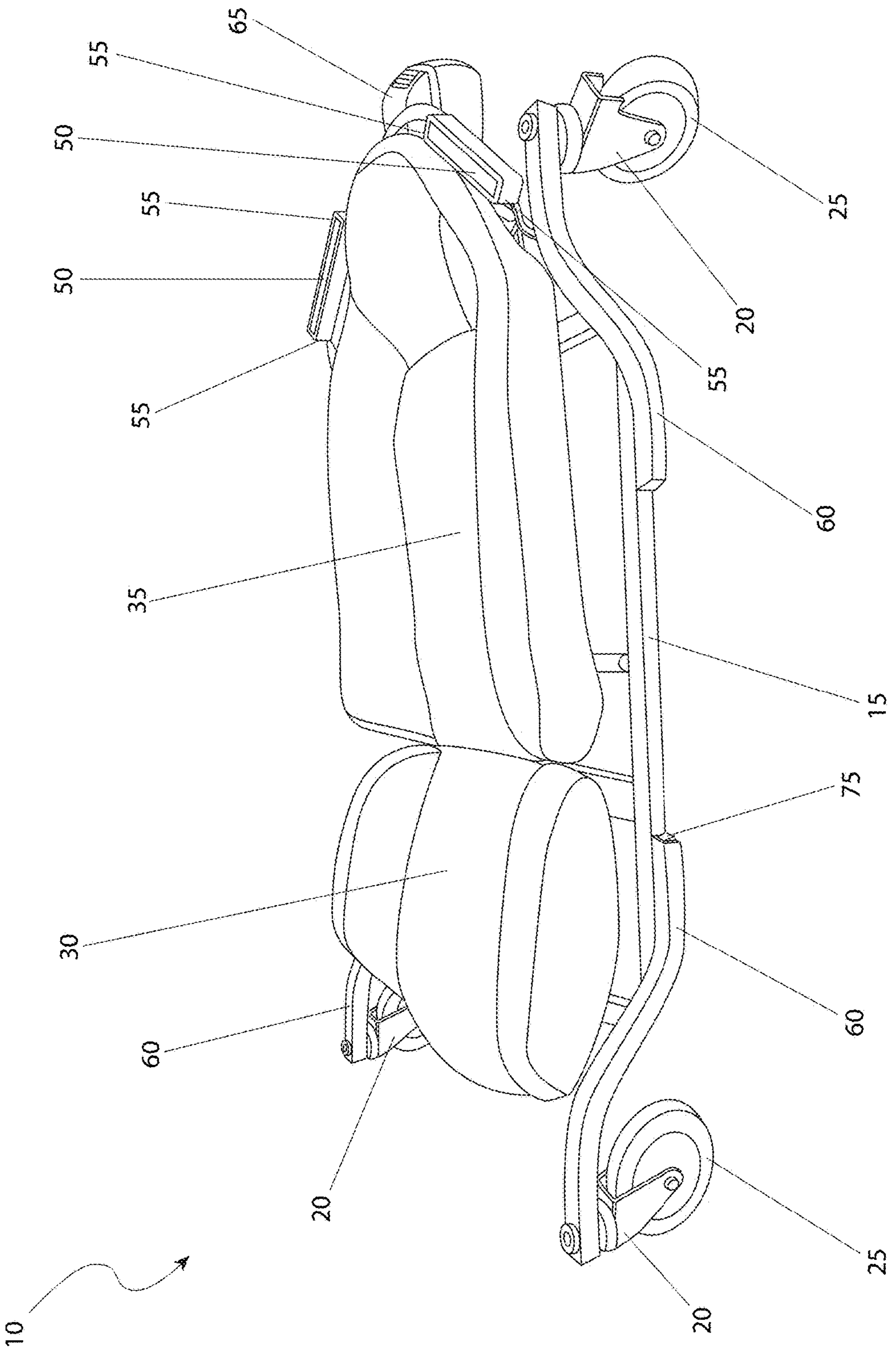
FIG. 2 is a side perspective view of the creeper 10, in its lowered state, according to the preferred embodiment of the present invention.

Referring next to FIG. 2, a side perspective view of the creeper 10, in its lowered state, according to the preferred embodiment of the present invention is depicted. The inclining back cushion 35 is in-line with the fixed seat cushion 30, thus resulting in an overall flat configuration, or at one-hundred-eighty-degrees (180°). This view provides further clarification on the four (4) casters 20 (of which only three (3) are shown due to illustrative limitations), all of which are equipped with five-inch diameter wheel 25. The frame 15 provides for offset extensions 60 (dog-leg shaped) that provides the ability to place the fixed seat cushion 30 and the inclining back cushion 35 at a lower overall elevation, close to grade, allowing use of the creeper 10 under low vehicles. The creeper 10 is powered by a removable battery pack 65, located on the underside of the frame 15 near the headrest 45 where it is easily accessible should it need to be removed when recharging is necessary. The removable battery pack 65 is located in between and underneath the light-emitting diode (LED) bar lights 50 and the swivel mount 55 so as to not interfere with the operation of the light-emitting diode (LED) bar lights 50 or cast shadows. It is envisioned that the removable battery pack 65 would be of the typical removable battery pack used to power portable tools such as those from DeWalt®, Milwaukee®, or the like. An adapter plate 70 (not shown in this view due to illustrative limitations) would allow use of different removable battery pack 65 from different manufacturers with the creeper 10. Each offset extension 60 (on the left-hand side of the user) is provided with a double-pole double-throw (DPDT) switch 75 on its proximal end. The double-pole double-throw (DPDT) switch 75 is of an on-off-on design with a maintained position in each state, and is used for changes in angular displacement of the inclining back cushion 35. Each opposite offset extension 60 (on the right-hand side of the user) is provided with a power switch 80 (not shown in this FIGURE due to illustrative limitations) on its proximal end.

The power switch 80 is used for ON/OFF control of the light-emitting diode (LED) bar lights 50. Further description on the electrical configuration of the creeper 10 will be provided herein below.

Figure 3:
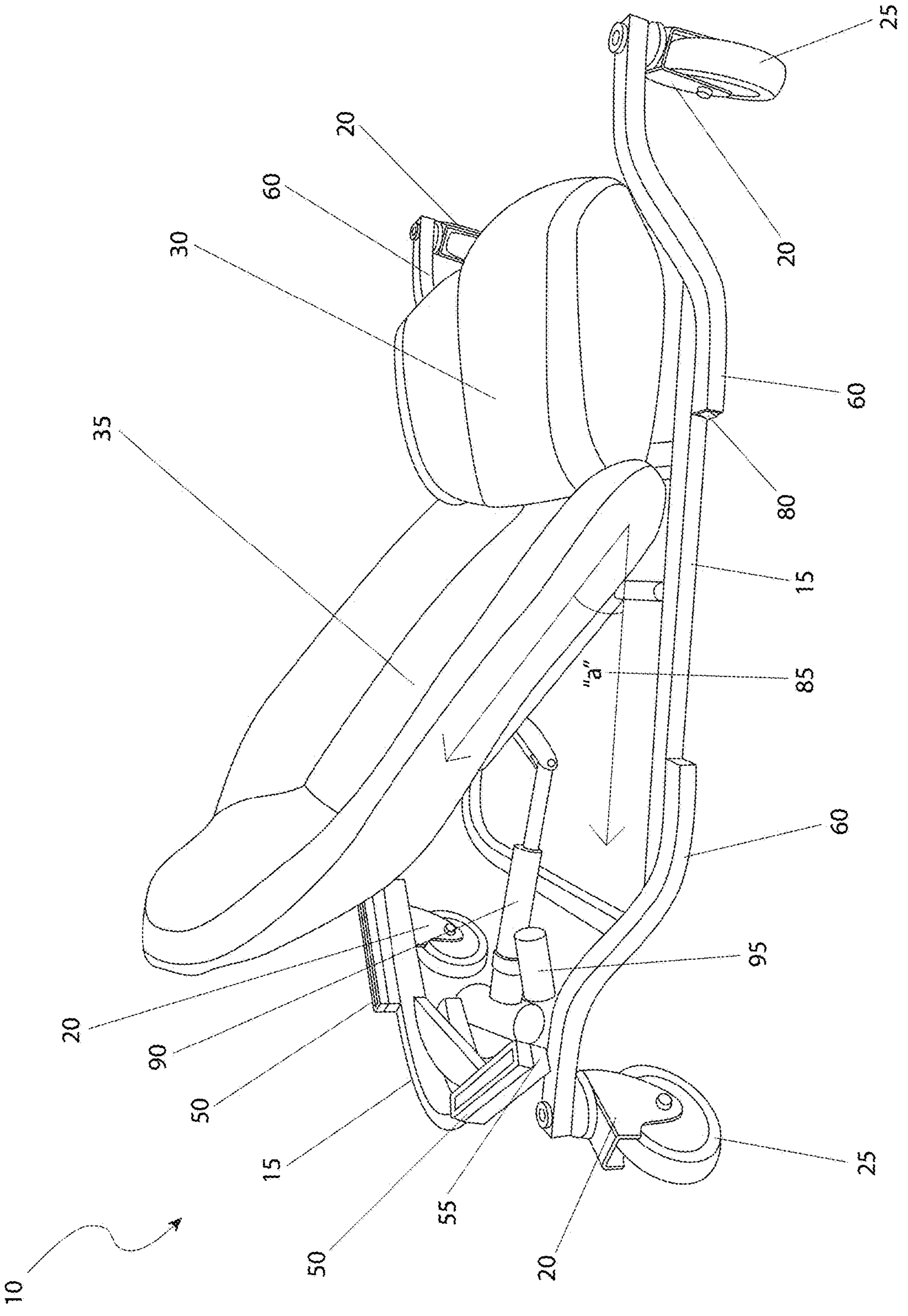
FIG. 3 is a side perspective view of the creeper 10, in its raised state, according to the preferred embodiment of the present invention.

Referring now to FIG. 3, a side perspective view of the creeper 10, in its raised state, with the removable battery pack 65 removed for viewing purposes according to the preferred embodiment of the present invention is shown. This side view, opposite in direction from FIG. 2, clearly depicts the frame 15 as well as the four (4) offset extensions 60, each with its own caster 20 and five-inch diameter wheel 25 as shown. Each offset extension 60 (on the right-hand side of the user) is provided with the power switch 80 for control of the light-emitting diode (LED) bar lights 50 as aforementioned described. The inclining back cushion 35 is capable of being elevated along an inclination angle "a" 85 in relation to the fixed seat cushion 30 by use of a corkscrew-type lifting mechanism 90 operated by a direct current motor 95 of a voltage level compatible with the removable battery pack 65 (as shown in FIG. 2).

The corkscrew-type lifting mechanism 90 operates in a conventional expected manner to raise and lower the inclining back cushion 35 while being able to support the upper body weight of the user. It is envisioned that the inclination angle "a" 85 is capable of a maximum angle of approximately sixty-degrees (60°). This feature is envisioned as being used to raise or lower one's body while underneath the vehicle. Finally, the feature may be used with the seat in the upper position when mounting the invention, and then lowering the inclining back cushion 35 to a flat position for ease and comfort.

Figure 4:
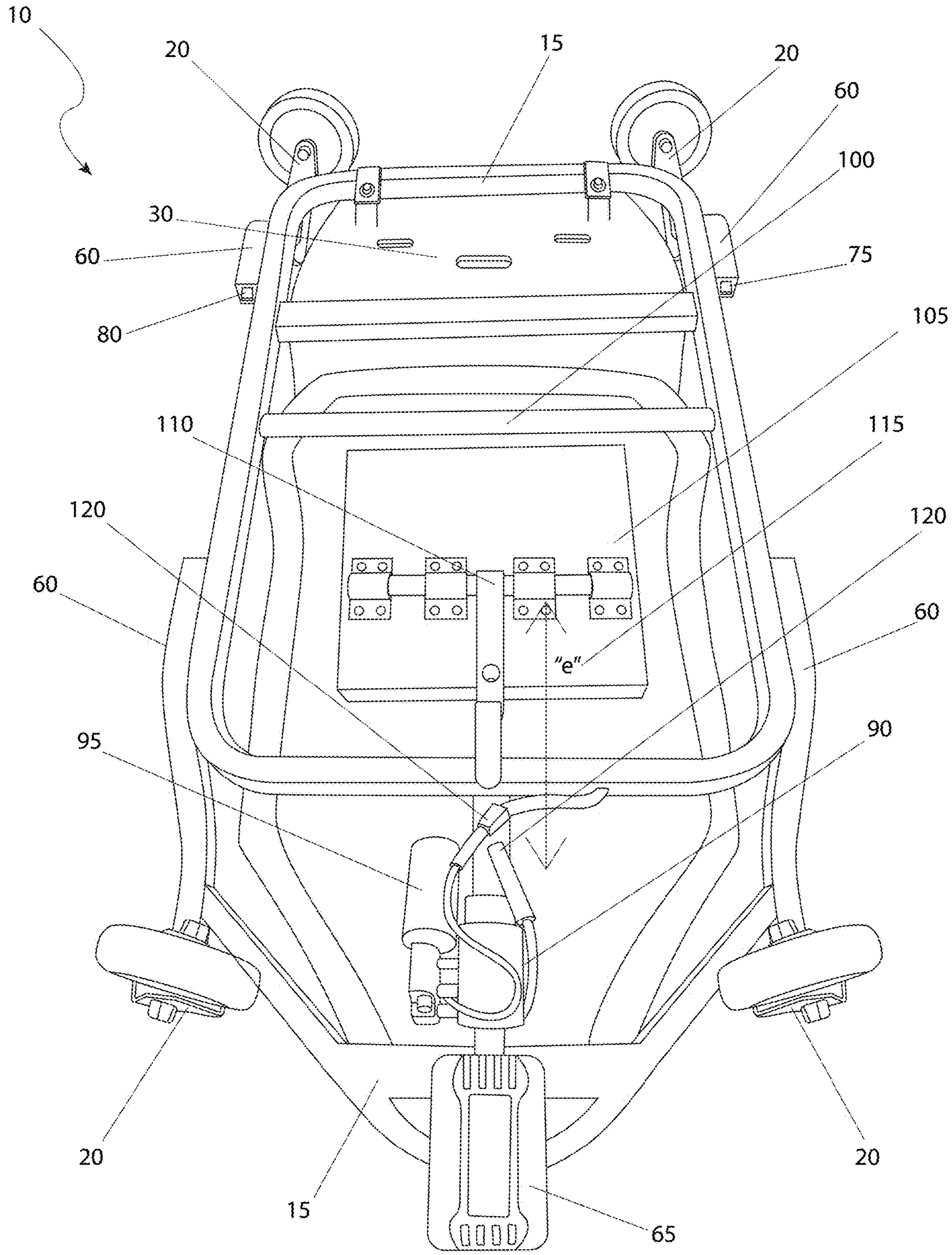
FIG. 4 is a bottom perspective view of the creeper 10, according to the preferred embodiment of the present invention; and, FIG. 5 is an electrical block diagram of the creeper 10, according to the preferred embodiment of the present invention.

Referring next to FIG. 4, a bottom perspective view of the creeper 10, according to the preferred embodiment of the present invention is disclosed. The frame 15 is shown with the offset extensions 60 attached as shown preferably by welding. The casters 20 are provided at the distal ends of the offset extensions 60 as shown. The lower offset extensions 60 (adjacent to the fixed seat cushion 30) are provided with the double-pole double-throw (DPDT) switch 75 and the power switch 80 as shown for electrical control of the direct current motor 95 and the light-emitting diode (LED) bar lights 50 (as shown in FIGS. 1-3) respectively. The inclining back cushion 35 is attached to the creeper 10 by use of a pivoting hinge 100 and a support backplate 105. The support backplate 105 is driven along the inclination angle "a" 85 (as shown in FIG. 3) by use of an extension arm 110 which travel along an extension arm travel path "e" 115. As such, movement along the extension arm travel path "e" 115 corresponds to movement along the inclination angle "a" 85 (as shown in FIG. 3). Finally, a wiring harness 120 is provided for connection to the removable battery pack 65, the double-pole double-throw (DPDT) switch 75, the power switch 80, the direct current motor 95, and the light-emitting diode (LED) bar lights 50. The wiring harness 120 is routed within the hollow confines of the frame 15 and the offset extensions 60, so as to not form a hazard when moving the creeper 10.

Figure 5:
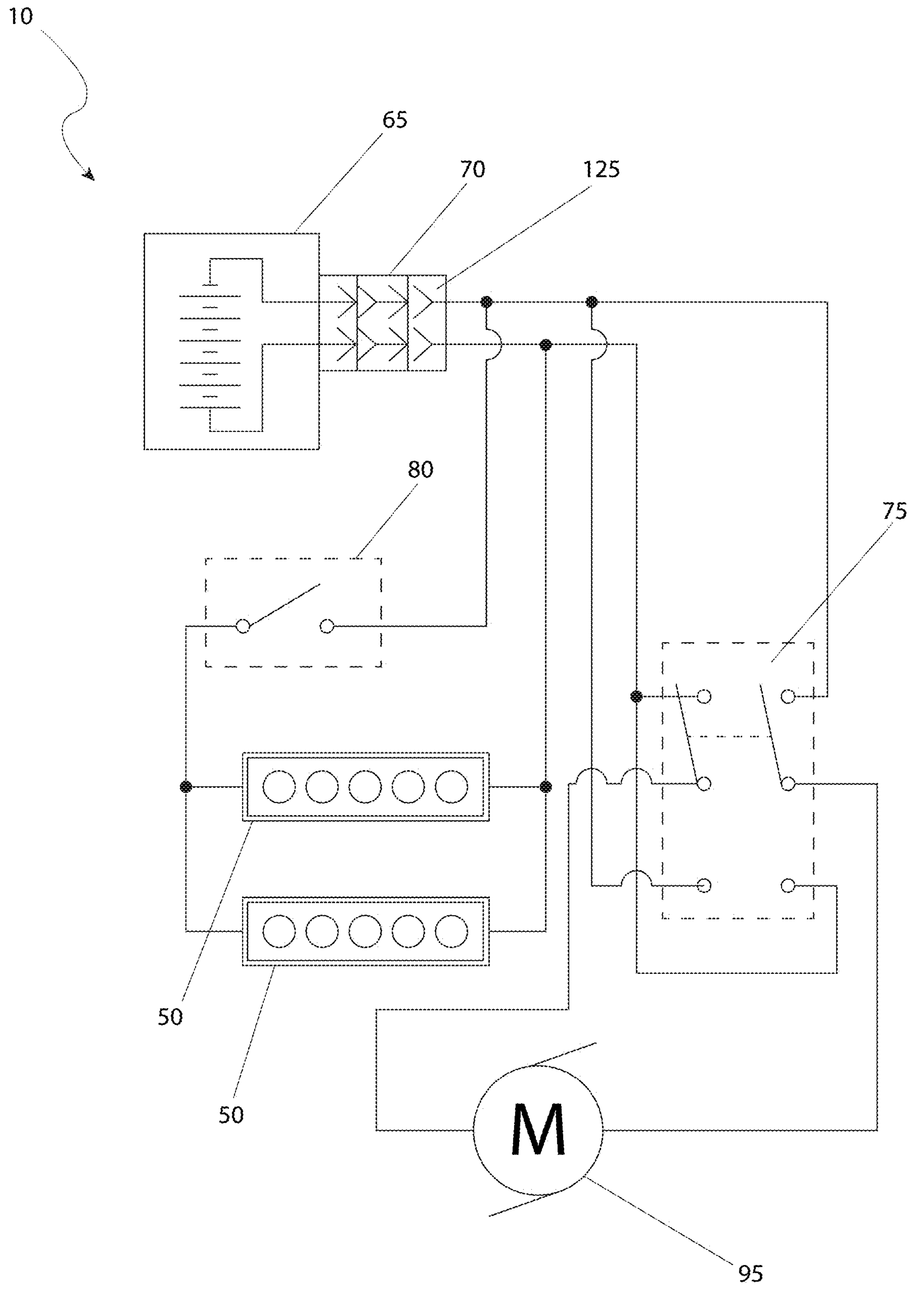

Referring finally to FIG. 5, an electrical block diagram of the creeper 10, according to the preferred embodiment of the present invention is depicted. Electrical power for the creeper 10 is derived from the removable battery pack 65. The removable battery pack 65 would be removed from the creeper 10 for recharging in much the same manner as other portable battery powered power tools. Such configuration allows sharing of the removable battery pack 65 with other similarly branded or even differently branded tools. Additionally, should the removable battery pack 65 become depleted, another removable battery pack 65, fully charged, can be substituted in immediately, allowing for continuous use of the creeper 10. The adapter plate 70 allows for electrical and physical interconnection of the removable battery pack 65 to a battery port 125, and thus allows use of different manufacturers batteries to be used as the removable battery pack 65 without regard to physical size, connection, or electrical characteristics. Power from the battery port 125 is then routed to the double-pole double-throw (DPDT) switch 75 and the power switch 80. The power switch 80 opens and closes the electrical circuit between the removable battery pack 65 and the two (2) light-emitting diode (LED) bar lights 50. The double-pole double-throw (DPDT) switch 75 works to reverse polarity to the direct current motor 95 causing it to run clockwise and counter-clockwise to extend and retract the extension arm 110 along the extension arm travel path "e" 115 (both of which are shown in FIG. 4). It is envisioned that the double-pole double-throw (DPDT) switch 75 would be an on-off-on style switch, thus deactivating the direct current motor 95 unless the double-pole double-throw (DPDT) switch 75 is physically held in one (1) position or the other.

2. Operation of the Preferred Embodiment

The preferred embodiment of the present invention can be utilized by the common user in a simple and effortless manner with little or no training. It is envisioned that the creeper 10 would be constructed in general accordance with FIG. 1 through FIG. 5. The user would procure the creeper 10 from conventional procurement channels such as hardware stores, home improvement stores, mechanical supply houses, mail order and internet supply houses and the like. Special attention would be paid to the make and manufacturer of the intended removable battery pack 65 to be used with the creeper 10, and that the proper adapter plate 70 is obtained.

After procurement and prior to utilization, a fully charged removable battery pack 65, using the proper adapter plate 70, would be installed on the battery port 125, and the creeper 10 placed near the vehicle upon which it is to be used. At this point in time, the creeper 10 is ready for use.

During utilization of the creeper 10, the inclining back cushion 35 would be raised to its maximum incline using the double-pole double-throw (DPDT) switch 75. The user would then sit on the fixed seat cushion 30 with their back against the inclining back cushion 35. The inclining back cushion 35 would then be lowered to a flat position (as shown in FIG. 2). The user, typically using their feet for propulsion in a normal manner, would move themselves and the creeper 10 to the desired position underneath a vehicle. Minor adjustments to the inclination angle "a" 85 may be made with the double-pole double-throw (DPDT) switch 75. Should supplemental task lighting be required, the light-emitting diode (LED) bar lights 50 would be energized using the power switch 80. The aiming angle of the light-emitting diode (LED) bar lights 50 would be adjusted using the swivel mount 55 on each bar lights 50. Mechanical work on the vehicle would then continue in a normal manner, albeit in increased comfort for the user and with enhanced lighting.

After use of the creeper 10, the user would fully lower the inclining back cushion 35 and propel themselves out from underneath the vehicle. The light-emitting diode (LED) bar lights 50 would be extinguished using the power switch 80. The inclining back cushion 35 would be fully raised, placing the user in a seated position rather than a supine position, thus making it easier to stand up. Should the physical work last for a long period of time, envisioned to be many hours, the removable battery pack 65 may be replaced as needed. Work then continues as described above in a cyclical and repeating process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A creeper apparatus comprising:

a frame having a top side and a bottom side, the frame comprising a plurality of tubular frame members of square metal tubing and four offset extensions that project upwardly and outwardly from the frame, each offset extension having a distal end and an offset extension lower side;

a caster at each distal end of the four offset extensions, each caster comprising a five-inch diameter wheel rotatable about a generally vertical axis to provide substantially 360-degree movement of the creeper apparatus;

a fixed seat cushion mounted to the frame;

an inclining back cushion aligned with the fixed seat cushion and pivotally mounted to the frame by a pivoting hinge and a support backplate, the inclining back cushion being movable between a flat configuration in which the inclining back cushion is substantially colinear with the fixed seat cushion and an inclined configuration in which the inclining back cushion is elevated at an inclination angle of up to approximately sixty degrees relative to the fixed seat cushion;

a pair of fixed seat cushion padded side bolsters attached to a right side and a left side of the fixed seat cushion;

a pair of inclining back cushion padded side bolsters attached to a right side and a left side of the inclining back cushion;

a headrest secured adjacent to an upper end of the inclining back cushion and between the pair of inclining back cushion padded side bolsters;

a pair of elongate light-emitting diode bar lights, each mounted to the frame adjacent the headrest by a respective swivel mount, each swivel mount permitting approximately 180 degrees of clockwise and counter-clockwise rotational movement of the corresponding light-emitting diode bar light, the swivel mounts being located on opposite lateral sides of the headrest and the pair of inclining back cushion padded side bolsters such that the pair of light-emitting diode bar lights are configured to illuminate a selectable area about a head of a user when the user is reclining on the headrest;

a removable rechargeable battery pack mounted on an underside of the frame adjacent the headrest and positioned between and beneath the pair of light-emitting diode bar lights so as not to interfere with adjustment of the light-emitting diode bar lights or cast shadows into the selectable area;

a battery port and an adapter plate mounted to the frame and configured to receive the removable rechargeable battery pack and electrically interface the removable rechargeable battery pack with the creeper apparatus;

a direct current motor mounted to the frame and mechanically coupled to a corkscrew-type lifting mechanism that engages the support backplate to raise and lower the inclining back cushion relative to the fixed seat cushion;

a wiring harness routed entirely within hollow interiors of the frame and the four offset extensions and interconnecting the battery port, the pair of light-emitting diode bar lights, the direct current motor, a double-pole double-throw switch, and a power switch;

the double-pole double-throw switch being mounted on a proximal portion of one of the offset extensions adjacent a first lateral side of the fixed seat cushion and configured to selectively reverse polarity of electrical power supplied from the removable rechargeable battery pack to the direct current motor to thereby raise and lower the inclining back cushion; and, the power switch being mounted on a proximal portion of an opposite one of the offset extensions adjacent an opposite lateral side of the fixed seat cushion and configured to selectively connect electrical power from the removable rechargeable battery pack to the pair of light-emitting diode bar lights; and, wherein the removable rechargeable battery pack is a sole source of electrical power for the direct current motor and the pair of light-emitting diode bar lights.

2. The creeper apparatus of claim 1, wherein:

the adapter plate is configured to mechanically and electrically couple removable rechargeable battery packs of different manufacturers having different physical sizes, terminal configurations, or voltage ratings to the battery port; and, the double-pole double-throw switch is an on-off-on style switch that deactivates the direct current motor when the double-pole double-throw switch is not held in either of two momentary positions.

* * * * *